(12) United States Patent
Cordova Boone

(10) Patent No.: US 9,649,884 B2
(45) Date of Patent: May 16, 2017

(54) BICYCLE TIRES WITH FOUR TREADS

(76) Inventor: Luis Cordova Boone, Jalisco (MX)

( * ) Notice: Subject to any disclaimer, the term of this patent is extended or adjusted under 35 U.S.C. 154(b) by 1185 days.

(21) Appl. No.: 14/126,645

(22) PCT Filed: Jan. 27, 2011

(86) PCT No.: PCT/MX2011/000009
§ 371 (c)(1),
(2), (4) Date: Feb. 19, 2014

(87) PCT Pub. No.: WO2011/159142
PCT Pub. Date: Dec. 22, 2011

(65) Prior Publication Data
US 2014/0150938 A1    Jun. 5, 2014

(30) Foreign Application Priority Data

Jun. 16, 2010    (MX) .................. MX/u/2010/000253

(51) Int. Cl.
| | | |
|---|---|---|
| *B60C 11/02* | (2006.01) | |
| *B60C 11/00* | (2006.01) | |
| *B60C 3/02*  | (2006.01) | |

(52) U.S. Cl.
CPC ............... *B60C 11/02* (2013.01); *B60C 3/02* (2013.01); *B60C 11/00* (2013.01); *B60C 2200/12* (2013.04)

(58) Field of Classification Search
CPC ... B60C 2200/12; B60C 2200/10; B60C 3/02; B60C 11/02; B60C 11/00; B60C 23/007; B60C 5/00; B60C 5/02; B60C 5/025; B60C 5/04; B60C 5/08; B60C 5/10; B60C 5/12; B60C 5/20; B60C 5/22
USPC ............................................. 152/209.11, 453
IPC ........................................................ B60C 11/02
See application file for complete search history.

(56) References Cited

U.S. PATENT DOCUMENTS 1,381,534 A    6/1921    Banschbach

FOREIGN PATENT DOCUMENTS

| BE | 510016 A | 4/1952 |
|---|---|---|
| DE | 4209687 A1 | 9/1993 |
| EP | 1 625 949 A1 | 2/2006 |
| FR | 1 406 806 A | 7/1965 |
| WO | 2006009419 A1 | 1/2006 |

OTHER PUBLICATIONS

International Search Report, dated Aug. 19, 2011, from corresponding PCT application.

*Primary Examiner* — Michael H Wilson
*Assistant Examiner* — Philip N Schwartz
(74) *Attorney, Agent, or Firm* — Young & Thompson

(57) ABSTRACT

The invention relates to a tire having four treads distributed equidistantly on the external part of the body or carcass, which allow the tire to be deflated and rotated in order for a new tread to be placed in contact with the ground when the current tread has been subjected to heavy wear, without the tire having to be replaced. The invention is advantageous for the tire owner since with just a small increase in outlay the owner is guaranteed a tire that will last longer and that can be used for an increased number of kilometers of cycling.

13 Claims, 2 Drawing Sheets

BICYCLE TIRES WITH FOUR TREADS

BACKGROUND

The bicycle is a man-powered two-wheeled vehicle that is non-polluting and is ideal for travel in both urban and rural areas, as well as for various sports uses.

The bicycle has acquired a great deal of importance today as a means of transportation with many advantages (no pollution, savings), whether social or sporting, as its use is synonymous with a healthy lifestyle.

Mass production resources, the use of every lighter, more resistant materials and the massive introduction of its use, especially in the socially most advanced countries, have led to lighter and safer bicycles and their everyday use has been widely expanding.

Bicycle Models

Utility bikes, mountain bikes, racing bikes, touring bikes, beach cruiser bikes, freight bikes, children's bikes, all-terrain bikes, road bikes, track bikes, time-trial bikes, cargo tricycles and rental bikes.

Cargo or transport tricycles are used to get around cities quickly, avoiding the environmental problems of noise and pollution.

They are used to transport all types of goods, by the postal service, for street sweepers and for transporting personnel.

Rental bicycles should be presented as a supplementary service alongside public transportation and as a solution to reduce environmental pollution in cities. This service is quite limited in Mexico, but in countries such as France, Spain, Germany, Holland, etc., they are widely used by thousands and thousands of people.

Bicycle Parts

Frame; skeleton or support for all the other components,
Handlebars; a characteristic component for steering the bicycle,
Seat; component on which the rider sits,
Pedals; which move the wheels via a chain,
Gearing; comprising the bottom bracket and the chain drive wheel, transferring power to the rear wheel via the chain,
Brakes; including the brake levers and braking systems,
Shifter; working the gear combinations,
Wheels; these are the bicycle components that have evolved the most, mainly comprising a metal rim on which the tire is mounted, a central hub which holds the wheel onto the frame, a valve for inflating the tire and the spokes which, taken together, form the wheel.

Tires

These are the most important components of a bicycle, although the cyclist has to change them periodically given that the treads, which are the flat part that comes into contact with the road surface, lose their grip due to the wear caused by friction; this occurs after years of use or thousands of kilometers covered even though the body or carcass is still in working condition.

This is due to the fact that traditional tires are designed with a single tread as can be seen in FIG. 1, which shows a traditional tire with its main components, comprising a body or carcass (1), a tread (2), drainage channels or grooves (3), a flange or rim containing a steel wire (4), the spokes (5), the central hub (6), the metal rim (7), the valve (8), the outside diameter (9) and the inside diameter of the tire (10).

FIG. 2 presents a side view of the same tire wherein, along with the aforementioned parts, the height of the tire (11), its width (12) and the metal rim part (13) are presented.

The wear produced by friction on the tread from various causes is what gave rise to this invention, which is structurally different from conventional tires and consists in adding three additional treads to the body or carcass after modification.

BRIEF DESCRIPTION OF THE DRAWING FIGURES

The characteristic details of this innovative tire can be clearly seen in the following description, and in the accompanying figures, which follow the same references to indicate the parts and figures shown.

DETAILED DESCRIPTION OF THE INVENTION

Figure 1:
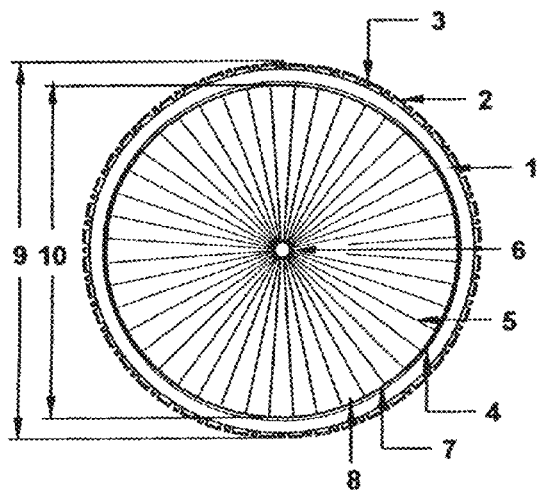
FIG. 1 shows a frontal view of a conventional bicycle tire mounted on a metal rim.
Figure 2:
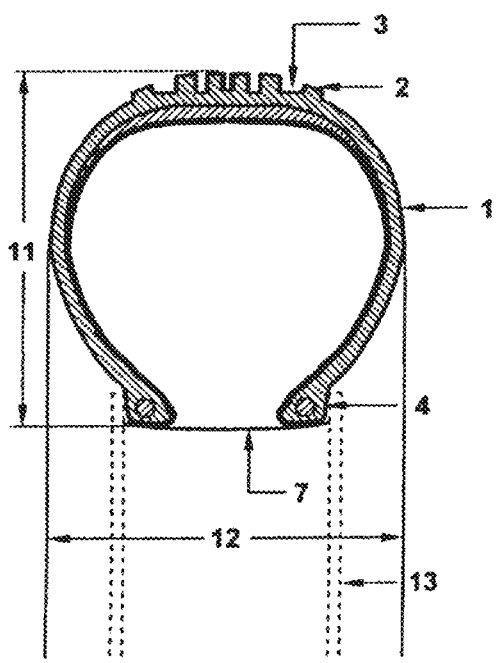
FIG. 2 shows a side view in a detailed cross-section of a conventional bicycle tire mounted on a metal rim.
Figure 3:
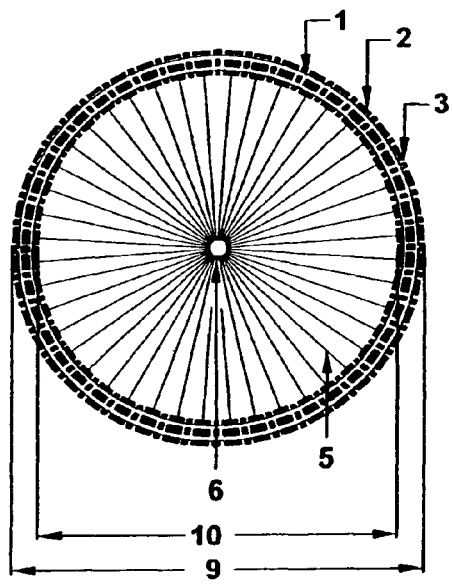
FIG. 3 shows a frontal view of the bicycle tire with four treads mounted on a metal rim.

In reference to said figures, FIG. 3 shows a frontal view of the new tire mounted on its metal rim and with some of its main parts, the body or carcass (1), the tread (2), drainage channels or grooves (3), spokes (5), central hub (6), outside diameter (9) and inside diameter (10).

The change proposed in the construction of the new tire consists in applying four treads (A,B,C and D) to the body or carcass, along the outside perimeter equidistant from each other.

Figure 4:
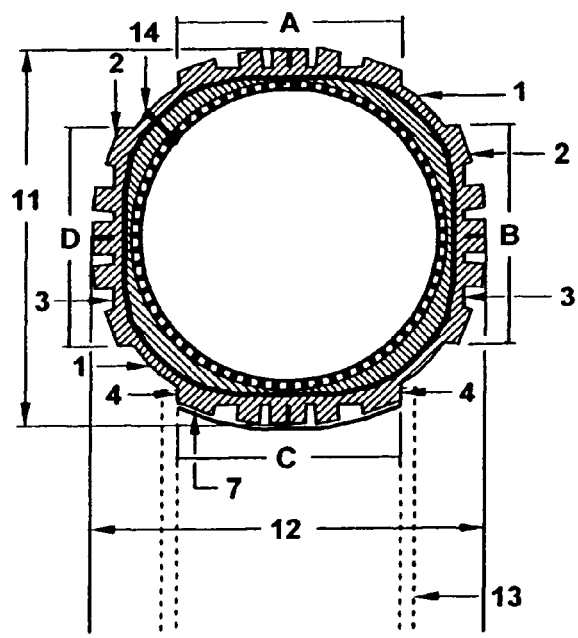
FIG. 4 shows a side view in a detailed cross-section of a bicycle tire with four treads mounted on a metal rim.

FIG. 4 shows a cross-section of this new tire, comprising a ring or hoop as the main part of the body or carcass (1), and whose outside perimeter includes four treads (A,B,C and D), equidistant from each other and, in this drawing, said treads are equal (2), but may be different if one is needed to ride on wet terrain or in the rain, another in sand or soil, another for pavement or asphalt, another with ice or snow whatever the desired design; they will also have drainage channels or grooves (3) to evacuate rainwater to the sides of the tire, flange or rim wire (4), which will be used to enable the tire to be fastened to the metal ring (7) of the rim (13), the height of the tire (11), and its base (12) will be the same in this utility model; the valve (14) used to inflate the tire; said valve may be similar to the one used in soccer balls, beach balls, etc. with the specificity that it will be positioned in a given configuration so as not to impede free rotation of the tire nor cause complications in mounting the tire on the rim, as a non-restrictive example, the valve's position is placed at 45° above the body of the tire, penetrating one of the angles formed between the treads.

The treads (A,B,C and D) of the new tire will be an integral part of it from the production phase and consequently will have to be identical in terms of their physical characteristics, production materials and chemical properties, while the faces of said treads may have the same or different designs.

It is emphasized that this invention is an improvement over the design of conventional tires in that it incorporates four treads instead of one as in conventional tires.

The above makes it possible, when the strip or band of tread in contact with the surface of the road or ground wears under the effects of friction and a new tread is desired, the tire will be deflated and taken off the metal rim, rotating clockwise or counterclockwise and, depending on the design or tread that is to be in contact with the ground, is remounted and inflated to provide a new tread, thus extending the life or use thereof.

This new tire will be useable on practically all existing types and models of bicycles excepting those used in official sports competitions, time trials, the Tour de France, the Giro d'Italia, Olympic and World Championship competitions, etc.

This invention has characteristics that enable it to be applied to bicycles as well as some motorcycle models; for this the diameters of the tires must be the largest in existence, and the height, which is the difference between the outside and inside diameters, must be as small as possible, so that the four treads can be applied to said tires.

In areas where the economic aspect is of utmost importance, this invention provides great advantages for the use of a tire with four treads, such as cargo tricycles, for the postal service, for transporting personnel or tourists, etc. The opposite is true with conventional tires insofar as such tires need to be changed more often.

The position of the treads (A,B,C and D) on the new tire can be changed in minutes so that this invention can be put into operation, starting by deflating and removing the tire, rotating it clockwise or counterclockwise, selecting the required tread, remounting the tire and inflating it to put it back into service.

With the above, a new tire can be obtained that lasts nearly three times longer than a conventional tire, providing additional kilometers of use and lower cost per kilometer ridden.

After the description of my invention, which I consider to be innovative, I claim exclusive ownership of the content of the following claims.

The invention claimed is:

1. A bicycle or motorcycle tire that mounts on a metal rim, the tire comprising:
   a carcass having an outside wall and a cross-section that is substantially circular in shape;
   four treads laid out on the outside wall of the carcass,
   wherein each tread has a flange having two sides for fastening to the metal rim, wherein each tread further has a series of drainage channels, and
   wherein the plurality of treads, along with the carcass, form a unitary body with a radial angle formed between each pair of adjacent treads; and a valve to inflate the tire, the valve penetrating one of the radial angles formed between the treads so as not to impede free rotation of the tire nor cause complications in mounting the tire on the metal rim.

2. A tire as claimed in claim 1, wherein, with the tire deflated and removed from the metal rim, the tire is sufficiently elastic for the whole tire to be rotated to change the position of the treads.

3. A tire as claimed in claim 1, wherein the valve is positioned at a 45° angle to the radial direction of a tire when mounted on the metal rim.

4. A tire as claimed in claim 1, wherein the treads are equidistant from each other around a transverse perimeter of the carcass.

5. A tire according to claim 1, wherein the treads have faces with the same design.

6. A tire according to claim 1, wherein the treads have faces with different designs.

7. A bicycle or motorcycle tire that mounts on a metal rim, the tire comprising:
   a carcass having an outside wall and a cross-section that is substantially circular in shape;
   four treads laid out on the outside wall of the carcass, each pair of adjacent treads being spaced apart by a radial angle,
   wherein each tread has a flange for fastening to the metal rim and a series of drainage channels, and
   wherein the plurality of treads, along with the carcass, form a unitary body; and
   a valve to inflate the tire, the valve penetrating the outside wall of the carcass at one of the radial angles formed between the treads.

8. A tire as claimed in claim 7, wherein, with the tire is deflated and removed from the metal rim, the tire is sufficiently elastic for the whole tire to be rotated to change the position of the treads.

9. A tire as claimed in claim 7, wherein the valve is positioned at a 45° angle to the radial direction of a tire when mounted on the metal rim.

10. A tire as claimed in claim 7, wherein the treads are equidistant from each other around a transverse perimeter of the carcass.

11. A tire according to claim 7, wherein the treads have faces with the same design.

12. A tire according to claim 7, wherein the treads have faces with different designs.

13. A tire according to claim 8, wherein said four treads laid out spaced equidistant from each other on the outside wall of the carcass.

* * * * *